United States Patent [19]

Williams

[11] Patent Number: 4,734,876

[45] Date of Patent: Mar. 29, 1988

[54] CIRCUIT FOR SELECTING ONE OF A PLURALITY OF EXPONENTIAL VALUES TO A PREDETERMINED BASE TO PROVIDE A MAXIMUM VALUE

[75] Inventor: Tim A. Williams, Austin, Tex.

[73] Assignee: Motorola, Inc., Schaumburg, Ill.

[21] Appl. No.: 810,451

[22] Filed: Dec. 18, 1985

[51] Int. Cl.[4] .............................................. G06F 7/02
[52] U.S. Cl. ................................... 364/715; 364/748
[58] Field of Search ............................ 364/715, 748; 340/146.2

[56] References Cited

U.S. PATENT DOCUMENTS

| | | | |
|---|---|---|---|
| 4,446,452 | 5/1984 | Munter | 340/146.2 |
| 4,539,549 | 9/1985 | Hong et al. | 340/146.2 |
| 4,597,053 | 6/1986 | Chamberlin | 364/715 |

Primary Examiner—David H. Malzahn
Attorney, Agent, or Firm—John A. Fisher; Jeffrey Van Myers; Robert L. King

[57] ABSTRACT

A circuit for receiving a plurality of signed operands which each represent an exponential value to a predetermined base and for selecting one of the operands which results in a maximum value is taught. The circuit has a rank ordered plurality of logic circuits which each receives a predetermined bit of each operand and provides an output bit of the maximum value. The output of the logic circuits is a transcoded output which is a translation value of the maximum value. A sign control circuit receives a sign bit of each signed operand and controls the operation of the logic circuits in response to the values of the input operands.

8 Claims, 4 Drawing Figures

CIRCUIT FOR SELECTING ONE OF A PLURALITY OF EXPONENTIAL VALUES TO A PREDETERMINED BASE TO PROVIDE A MAXIMUM VALUE

TECHNICAL FIELD

This invention relates generally to circuits which utilize logarithmic arithmetic, and more particularly, to digital signal processors which utilize logarithmic operands.

BACKGROUND ART

Digital signal processing has typically been effected only using the linear number system. However, a digital signal processor for general purpose calculating may be efficiently implemented in the logarithmic number system as taught in U.S. Pat. No. 4,682,302, assigned to the assignee hereof and entitled "A Logarithmic Arithmetic Logic Unit". When implementing digital signal processing algorithms, a maximum value of a plurality of operands must typically be chosen. In a linear number system, a maximum valued operand in a plurality of operands is typically found by determining the bit position of the most significant bit of each operand. This is an easy calculation which is readily made by electronic hardware. However, since others have not implemented digital signal processors in the logarithmic number system, the need to efficiently determine a maximum logarithmic valued operand in a plurality of logarithmic operands has not been adequately addressed. Due to the nonlinear nature of the logarithmic number system, a maximum valued operand cannot be determined by the method previously used for linear numbers.

BRIEF DESCRIPTION OF THE INVENTION

Accordingly, an object of the present invention is to provide an improved circuit for selecting one of a plurality of exponential values to a predetermined base to provide a maximum value.

Another object of the present invention is to provide an improved logarithmic magnitude comparator.

A further object of the present invention is to provide an improved circuit and method for determining the maximum logarithmic value of a plurality of exponential operands represented in the same base.

In carrying out the above and other objects of the present invention, there is provided, in one form, a circuit for receiving a plurality of signed input operands representing exponential values to a predetermined base and providing the operand which represents a maximum value. A first transcoder sequentially receives each of the input operands and provides a first intermediate operand in response to each operand. The first intermediate operand indicates bit position of a most significant bit of each first intermediate operand. Logic circuitry is coupled to the first transcoder for selectively receiving the first intermediate operands and comparing a most recently received first intermediate operand with a previous maximum valued first intermediate operand to provide a second intermediate operand. The second intermediate operand is stored and represents a maximum valued operand of the first intermediate operands. A second transcoder is coupled to the logic circuitry for selectively receiving the second intermediate operands and comparing a most recently received second intermediate operand with a previous maximum valued second intermediate operand to provide the operand resulting in a maximum value in a translated form. A sign control circuit receives a sign bit of each of the input operands and provides a sign bit of output maximum value in addition to providing control signals for the other circuitry.

These and other objects, features and advantages will be more clearly understood from the following detailed description taken in conjunction with the accompanying drawings.

DETAILED DESCRIPTION OF THE INVENTION

Figure 1:
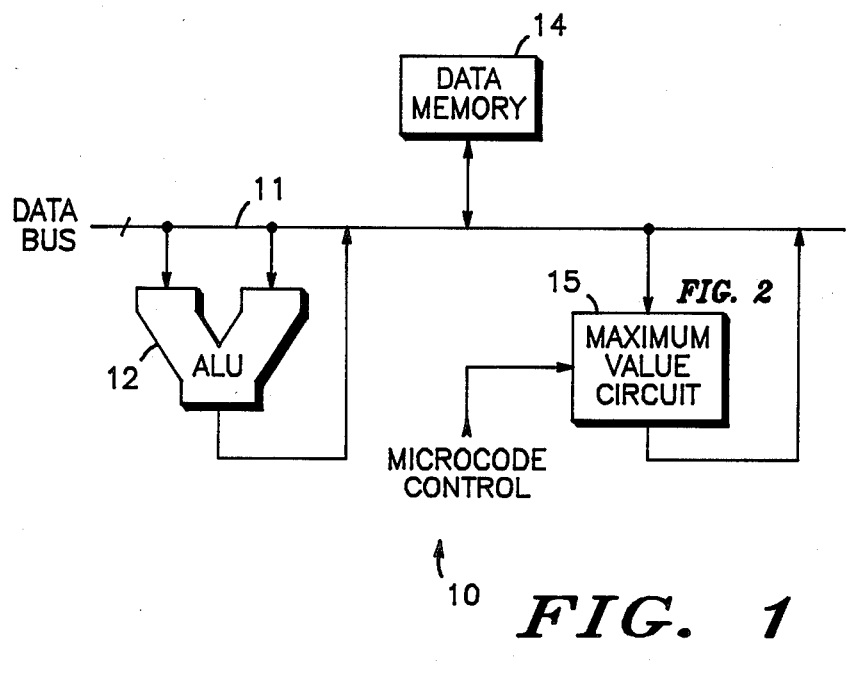
FIG. 1 illustrates in block diagram form a portion of a logarithmic digital signal processor using the present invention.

Shown in FIG. 1 is a portion of a logarithmic digital signal processor 10 having operands communicated via a data bus 11. An arithmetic logic unit (ALU) 12 has a first input coupled to data bus 11, a second input coupled to data bus 11, and an output coupled to data bus 11. A data memory circuit 14 is bidirectionally coupled to data bus 11. A maximum value circuit in accordance with the present invention has an input coupled to data bus 11 and an output coupled to data bus 11. A control input of maximum value circuit 15 is coupled to predetermined microcode for controlling maximum value circuit 15.

In operation, signal processor 10 communicates operands in logarithmic form via data bus 11 to implement predetermined digital signal processing algorithms. A typical calculation required to implement such algorithms involves using a plurality of operand values stored in memory 14 and scaling the operands to a predetermined function having distinct permissible upper and lower values. In order to effect a scaling operation, a maximum value of the operand values must first be found so that all other operands may be properly scaled to the maximum value. When exponents are involved, a determination of maximum value operands may not always be readily calculated due, in part, to the fact that exponential values are typically communicated and stored separately from associated base value operands. Converting base and exponential values to actual numerical values before comparing the actual values for a maximum is very slow and inefficient. Therefore, the present invention efficiently performs the function of providing a maximum value by using only exponential values in a logarithmic system such as digital signal processor 10. However, it should be readily understood that the system example of FIG. 1 is intended to illustrate by way of example only one of many applications for the present invention.

Figure 2:
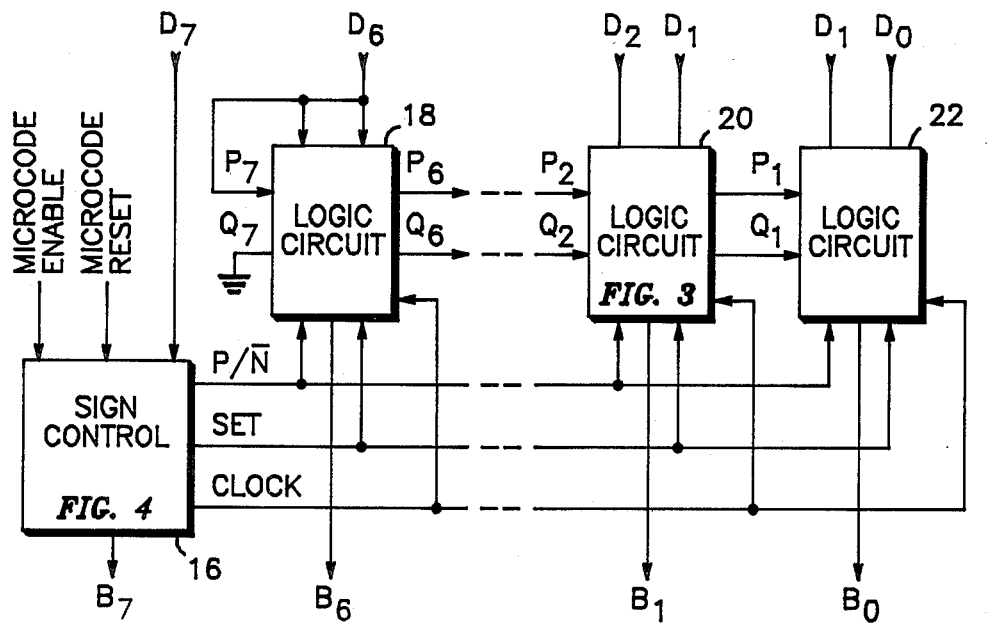
FIG. 2 illustrates in block diagram form a maximum value circuit in accordance with the present invention.

Shown in FIG. 2 is maximum value circuit 15 of FIG. 1 having a rank ordered plurality of n logic circuits, where n is an integer. In general, circuit 15 comprises a sign control circuit 16, a logic circuit 18, a logic circuit 20 and a logic circuit 22. For purposes of explanation only, an eight bit circuit is described in which seven logic circuits and a sign control circuit are required. However, for convenience of illustration, only three logic circuits are illustrated wherein intermediate logic circuits are omitted as indicated by the dashed lines. A signed input operand D which is a two's complement number is coupled as an input from bus 11 to maximum value circuit 15. Bit $D_0$ is the least significant bit of operand D and bit $D_6$ is the most significant bit. Bit $D_7$ is a sign bit and is coupled to an input of sign control circuit 16. Sign control circuit 16 has both an enable input for receiving a microcode enable signal and a reset input for receiving a microcode reset signal. A first output of sign control circuit 16 provides a polarity signal labeled (P/$\overline{\text{N}}$). A second output of sign control circuit 16 provides a set signal, and a third output of sign control circuit 16 provides a clock signal. A fourth output of sign control circuit 16 provides an output bit labeled "$B_7$" which is a sign bit of the output. Logic circuits 18, 20 and 22 are substantially identical logic circuits in which each circuit has an input for receiving the polarity signal, a set input terminal and a clock input terminal. Logic circuits 18, 20 and 22 are rank ordered in which logic circuit 18 is the highest ranked circuit and logic circuit 22 is the lowest ranked circuit. Each logic circuit except the highest ranked logic circuit 18 has two inputs for receiving two predetermined bits of input operand D. Logic circuit 18 has two analogous inputs but both inputs are coupled to the highest ranked input bit $D_6$. Accordingly, logic circuit 22 is coupled to lowest ranked input bits $D_0$ and $D_1$. Each logic circuit provides a single bit of output operand B which is coupled to data bus 11. Lowest ranked logic circuit 22 provides the lowest ranked output bit $B_0$ (least significant) and so forth thru highest ranked logic circuit 18 which provides the highest ranked outout bit $B_6$ (most significant). Each of the logic circuits has cross coupled rank ordered inputs labeled "P" and "Q" whose function will be explained in detail below.

In operation, a plurality of input operands are sequentially coupled in parallel to maximum value circuit 15. The input operands D each represent an exponential value which correlate to a common predetermined base value which is less than one. The output operand B represents a translated value which corresponds to the input operand which provides the maximum value of the predetermined base raised to the exponential values received. The output operand B is not the binary representation of the resulting maximum value but rather is a translated maximum number which may be used by ALU 12 of FIG. 1 to scale all the exponential values to a predetermined scale. Logic circuits 18, 20 and 22 are combinatorial logic circuits which function to examine the bit position of each input operand and latch the positive operand having a "one" value in the highest bit position. Sign control circuit 16 informs the logic circuits whether the input operand being received is positive or negative. Assuming a base which is less than one, a negative operand will always provide a larger resulting number than a positive operand. Therefore, a negative operand immediately replaces any previous positive operands as the maximum value operand. If a negative operand was previously received and latched as the maximum value, the most recently received negative operand is compared with the previous operand. The operand which has a zero in the most significant bit position is latched and retained as the maximum value. The logic circuits are simultaneously clocked to receive the input operand bits and to compare the most recently received operand with the previously received maximum value. By use of the microcode enable signal, predetermined ones of the received input operands may be ignored and chosen not to be evaluated. After a predetermined series of numbers has been evaluated and a maximum value for the series identified, the maximum value may be provided by clocking the logic circuits. The logic circuits are reset for consideration of another group of numbers by the microcode reset signal. Sign control circuit 16 is reset and provides a set signal for resetting the logic circuits.

Figure 3:
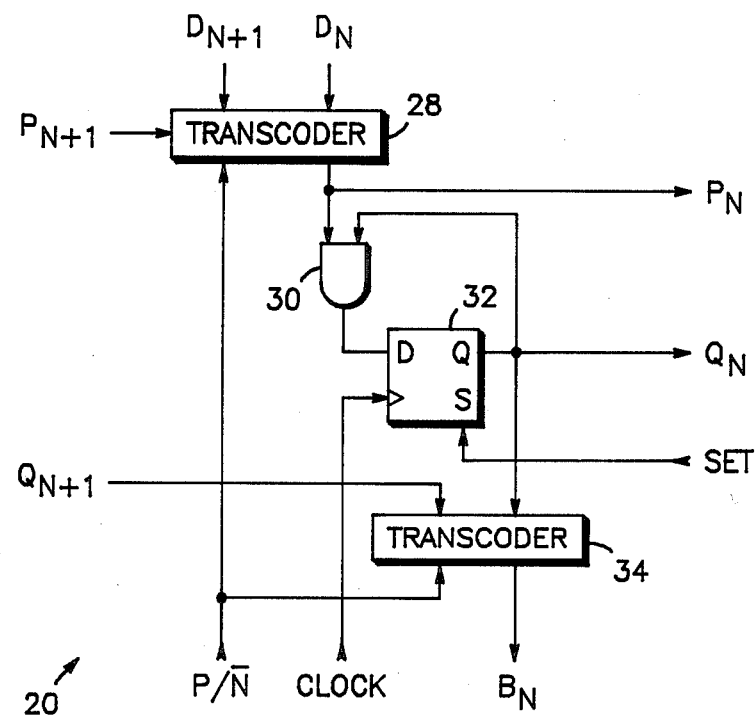
FIG. 3 illustrates in block diagram form one of the logic circuits of FIG. 2.

Shown in FIG. 3 is a block diagram of logic circuit 20 of FIG. 2. For the purpose of general illustration, the rank ordered operand bits which are coupled to logic circuit 20 are illustrated with generic labels wherein logic circuit 20 is assigned a rank of "N", where N is also an integer. Transcoder 28 has two inputs for receiving predetermined bits of the input operand D. The input bits are illustrated by $D_N$ and $D_{(N+1)}$ which represent input bits of adjacent rank. It should be noted that the logic circuit of highest rank, logic circuit 18, has two inputs coupled to the same input bit which is the most significant bit. A third input of transcoder 28 is coupled to the polarity signal. A fourth input is coupled to a signal labeled "$P_{(N+1)}$" which is the output of an analogous transcoder circuit for a logic circuit of immediately higher rank. An output of transcoder 28 provides a signal labeled "$P_N$" which is connected to a first input of an AND gate 30. An output of AND gate 30 is connected to a "D" input of a flip-flop circuit 32. A clock input of flip flop 32 is coupled to a clock signal, and a set input of flip flop 32 labeled "S" is coupled to a set signal. An output of flip flop 32 labeled "Q" provides a signal labeled "$Q_N$" and is connected to a second input of AND gate 30 and to a first input of a transcoder circuit 34. A second input of transcoder circuit 34 is coupled to a signal labeled "$Q_{N+1}$" which is a Q output of a flip flop analogous to flip flop 32 in a logic circuit of immediately higher rank. A third input of transcoder 34 is coupled to the polarity signal. An output of transcoder 34 provides an Nth ranked output bit $B_N$ of the maximum value operand.

In operation, maximum value circuit 20 provides the maximum value by using substantially, a first transcoder, a latch and a second transcoder. Transcoder 28 functions to encode the incoming operands into a mask. The mask is logically ANDed with the current state of the latch to provide an input to the second transcoder. The second transcoder provides the maximum value in response to whether a negative number was among the operands received. Transcoder 28 functions substantially in accordance with the following truth table.

| P/$\overline{\text{N}}$ | P(n + 1) | D(n + 1) | Dn | Pn |
|---|---|---|---|---|
| 1 | 0 | 0 | 0 | 0 |
| 1 | 0 | 0 | 1 | 1 |
| 1 | X | 1 | X | 1 |
| 1 | 1 | X | X | 1 |
| 0 | 1 | 1 | 1 | 1 |
| 0 | 0 | X | X | 0 |
| 0 | 1 | 0 | X | 0 |
| 0 | 1 | 1 | 0 | 0 |

From the illustrated truth table, it can be readily seen that the masked output of transcoder 28 is a single digit output which depends upon the polarity of the input operand being examined and upon variations of combinations of the first transcoder output of the logic circuit of immediately higher rank and the digital state of the two received input bits. An "X" indicates that the logic level is irrelevant to circuit performance. When the input operand is positive as indicated by the polarity signal having a digital "one" value, the cumulative P output operand provided by all the logic circuits is an operand having a a "one" in the same digit positon corresponding to the digit position of the most significant "one" of the input operand. All digits to the right of this digit position are forced to also be "one", and all digits to the left of this digit position are forced to be "zero". In other words, the first transcoders in the logic circuits such as transcoder 28 in logic circuit 20 function to identify the bit position of the most significant "one" of each positive input operand and provide an intermediate masked operand labeled P which has a "one" in the identified most significant bit position and all "ones" to the right thereof and all "zeroes" to the left thereof. If the input operand is negative, transcoder 28 provides an analogous masked bit $P_N$ with the exception that the input operand is examined to determine the bit position of the most significant "zero". The resulting mask operand P is an operand with "one" values in all digit positions to the left of the corresponding most significant "zero" digit position of the input operand and "zero" values in all other digit positions. In order to provide this transcoded mask operand, the immediately higher ranked digit of the P operand must be examined to determine whether a "zero" or "one" has already been detected to the left in addition to inspecting the input digit of current rank.

After providing a ranked bit $P_N$ of the P operand, bit $P_N$ is coupled to both the logic circuit of immediately lower rank (not shown) and to AND gate 30 where bit $P_N$ is logically ANDed with the ranked bit $Q_N$. Before any input operands are received by transcoder 28 and other analogous ranked transcoders, all bits of the Q operand are set to "one" by the SET signal provided by sign control circuit 16. Further, if the first operand received is not a negative number, when the first negative number to be received is detected and a transition in polarity from positive to negative operands occurs, a reset of flip flop 32 is also made by the SET signal. AND gate 30 and flip flop 32 function in conjunction to provide a Q operand to transcoder 34 which reflects where the lowest ranked or most significant "one" of any positive operands received was by having a "one" in that bit position and having all "one" values to the right thereof and all "zero" values to the left thereof. If any negative numbers have been received, the Q operand will reflect where the highest ranked or most significant "zero" of any negative operands was by having a "zero" in that bit position and having all "zero" values to the right thereof and all "one" values to the left. In this mannner, the output of flip flop 32 latches the largest resulting value (i.e. the largest negative valued operand) by storing which digit positions did not have "ones" (or "zeroes") when previously received.

The ranked Q bit of immediately higher rank, $Q_{(N+1)}$ and the Q bit of current rank, $Q_N$, are both coupled to transcoder 34. Transcoder 34 functions substantially in accordance with the following truth table.

| P/$\overline{\text{N}}$ | Qn + 1 | Qn | Bn |
|---|---|---|---|
| 0 | X | 0 | 0 |
| 0 | X | 1 | 1 |
| 1 | 0 | 0 | 0 |
| 1 | 0 | 1 | 1 |
| 1 | 1 | 0 | X |
| 1 | 1 | 1 | 0 |

From the illustrated truth table, it can be readily seen that the masked output of transcoder 34 is a single digit output which depends upon the polarity of the input operand and upon either or both the output of flip flop 32 of the immediate rank and the analogous flip flop output of next higher rank. As before, an "X" indicates a logic condition which is irrelevant to circuit performance. When the input operand is positive as indicated by the polarity signal having a digital "one" value, the value of the output bit $B_N$ is the same as bit $Q_N$ if the next higher ranked Q bit is a logic "zero". If the logic values of the Q operand bits for the current ranked logic circuit and the next higher ranked logic circuit are both "zero", the output bit $B_N$ is a logic "zero". The logic state of the Q bit for the current ranked logic circuit will never be "zero" if the logic state of the immediately higher ranked Q bit is "one" due to the way the transcoding logic is defined. Therefore, the truth table for transcoder 34 illustrates the logic state for bit $B_N$ under these conditions with an "X". When the D input operand is a negative number as indicated by a "zero" valued polarity signal, the $B_N$ output bit value depends solely upon the value of the $Q_N$ bit and is the same value as $Q_N$. In this manner, transcoder 34 functions in conjunction with analagous transcoders of the rank ordered plurality of logic circuits to provide a masked output operand B. If the input D operands are all positive, operand B contains only one bit with a "one" value. The bit position having a "one" is masked to indicate the most significant bit of the maximum valued positive operand which was received. However, if one or more negative operands are received during the maximum value determination, the B output operand is masked as a signed number which has a "zero" value in the same bit position as the most significant "zero" in the maximum value. The B output operand will also have all "zeroes" to the right of this operand value and all "ones" to the left thereof. In this way, the B output operand is masked as a binary output which is a convenient form for processing.

Figure 4:
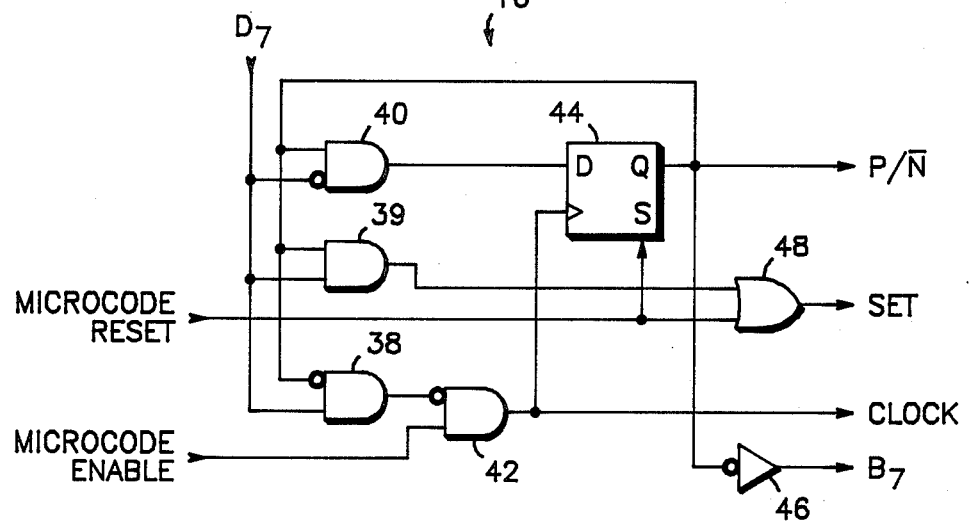
FIG. 4 illustrates in block diagram form the sign control circuit of FIG. 2.

Shown in FIG. 4 is one form of an implementation of sign control circuit 16 of FIG. 2 which provides the polarity signal in addition to set and clock signals described above. Sign bit $D_7$ is connected to an active high input of an AND gate 38, to a first input of an AND gate 39 and to an active low input of an AND gate 40. An active high input of AND gate 40 is connected to both an active low input of AND gate 38 and a second input of AND gate 39. An output of AND gate 38 is connected to an active low input of an AND gate 42, and an active high input of AND gate 42 is connected to an enable signal labeled "Microcode Enable". An output of AND gate 42 provides a clock signal and is coupled to a clock input of a D-type flip flop circuit 44. The active high input of AND gate 40 is connected to a "Q" output of flip flop 44 and to an active low input of a latch 46 for providing the polarity signal at the output of flip flop 44. An output of latch 46 provides the sign bit $B_7$ of the maximum value operand B. An output of AND gate 40 is connected to a "D" input of flip flop 44. A reset signal labeled "Microcode Reset" is connected to both a first input of an OR gate 48 and to a set input of flip flop 44 labeled "S". An output of AND gate 39 is connected to a second input of OR gate 48. An output of OR gate 48 provides a "Set" signal.

In operation, sign control circuit 16 functions to provide the polarity signal in response to the logic state of the received input sign bit $D_7$. Initially, the reset signal which is microcode controlled is used to set flip flop 44 so that the output of flip flop 44 is a logic "one" initially indicating receipt of a positive operand. AND gate 40 will provide a logic "one" as long as a logic "zero" is received as the sign bit indicating that positive operands are being received. If sign bit $D_7$ is a logic "one", AND gate 40 is nonconductive and the "Q" output of flip flop 44 is a logic "zero" indicating that a negative operand has been received. AND gate 40 will remain nonconductive until flip flop 44 is again set. The microcode reset signal results in OR gate 48 providing a set signal for each of the logic circuits. A set signal is also provided for one clock cycle whenever the polarity of input operands changes from positive to negative. When a transition of polarity occurs from positive to negative, AND gate 39 becomes conductive which makes OR gate 48 provide a set signal. At the same time, AND gate 40 becomes nonconductive which makes the Q output of flip flop 44 a logic "zero" at the next clock cycle. As soon as the Q output of flip flop 44 is a logic "zero", AND gate 39 becomes nonconductive which removes the set signal. The clock signal is provided via AND gate 42 at the frequency of the microcode enable signal. The clock signal is also temporarily inhibited after a transition of polarity of input operands from positive to negative in the event a positive operand is coupled to the maximum value circuit thereafter. The inhibited clock prevents the "Q" operand in the logic circuits from being changed. The clock inhibit circuit functions during receipt of positive operands once a negative operand has been received by inhibiting AND gate 38.

By now it should be apparent that a maximum value circuit has been provided which receives a plurality of signed operands which each represents exponential values to a predetermined base of less than one. Therefore, any negative valued operand will always result in a greater value than a positive operand regardless of the relative magnitudes of the operands themselves. Further, the maximum value circuit is able to detect and latch the maximum value and continue examining other operands. Only if a subsequent operand results in a greater value will the current maximum value be updated. The present invention provides a circuit which can quickly check a plurality of operands in a logarithmic system and decide which operand is the largest value. Although the present invention is illustrated as providing the maximum value of signed operands, the invention may also be used to provide a maximum value of only positive or only negative operands. In such an application sign control circuit 16 is not required to monitor the signs of the received input operands and the polarity signal is set to a predetermined logic state depending upon the polarity of operands to be received. The present invention may also be modified to select a minimum value of the input operands rather than a maximum value. In the system illustrated in FIG. 1, the present invention functions as a logarithmic magnitude comparator for purposes of scaling a plurality of operands to a predetermined function. However, the illustrated use of the present invention is by way of example only and many other applications for a magnitude comparator taught herein in a logarithmic system exist.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true spirit and scope of the invention.

I claim:

1. A circuit for receiving a plurality of input operands representing exponential values relative to a predetermined base value which is less than one and selecting the operand which when used as an exponent of the base value represents a maximum value, comprising:

first transcoder means for sequentially receiving each of the input operands and providing a first intermediate operand in response to each received operand, each of the first intermediate operands indicating the bit position of a most significant bit of the respective input operand;

logic means coupled to the first transcoder means for selectively receiving the first intermediate operands and comparing a most recently received first intermediate operand with a previous maximum value first intermediate operand to provide a second intermediate operand which represents the maximum valued operand of all of the previously received first intermediate operands including the most recently received first intermediate operand; and second transcoder means coupled to the logic means for selectively receiving the second intermediate operands and transcoding each received second intermediate operand to provide an output indicating the one of the plurality of input operands which raises the base value to the maximum value.

2. The circuit of claim 1 wherein the input operands are signed operands and the circuit further comprises:

sign control means for receiving a sign bit of each signed input operand and providing an output sign bit of the maximum value, said sign control means further providing control signals to the first and second transcoder means and to the logic means to control said circuit.

3. The circuit of claim 1 wherein the logic means further comprises a logic coupled to a latch circuit, said logic gate receiving the first intermediate operand and said latch circuit providing the second intermediate operand.

4. A circuit for receiving a plurality of input operands representing exponential values relative to a predetermined base less than one and providing the operand which when used as an exponent of the base value represents a maximum value, comprising:

first logic means for sequentially receiving each of the input operands and providing a first intermediate operand in response to each operand, each of said first intermediate operands indicating the bit position of a most significant bit of the respective input operand;

second logic means having a first input for receiving the first intermediate operand, a second input and an output, said second logic means performing a predetermined logic function with said first and second inputs;

storage means having an input coupled to the output of the second logic means, and an output coupled to the second input of the second logic means for storing and providing a second intermediate operand which represents the one of all of the previously received first intermediate operands including the most recently received first intermediate operand which raises the base value to the maximum value; and third logic means coupled to the storage means for selectively receiving the second intermediate operands and transcoding the second intermediate operands to provide an output indicating the one of the plurality of input operands which raises the base value to the maximum value.

5. The circuit of claim 4 wherein the second logic means is an AND gate.

6. The circuit of claim 4 wherein the storage means is a D-type flip flop.

7. The circuit of claim 4 wherein the input operands are signed operands and the circuit further comprises:
sign control means for receiving a sign bit of each signed input operand and providing an output sign bit of the maximum value, said sign control means further providing control signals to the first and third logic means and storage means to control the operation of said circuit.

8. A method for receiving a plurality of input operands representing exponential values relative to a predetermined base less than one and providing the operand which when used as an exponent represents a maximum value, comprising the steps of:
sequentially receiving each of the input operands and providing a first intermediate operand in response to each operand, each of the first intermediate operands indicating bit position of a most significant bit of the respective input operand;

comparing a most recently generated first intermediate operand with a previous maximum valued first intermediate operand to provide a second intermediate operand representing a maximum valued operand of all of the previously received first intermediate operands including the most recently received first intermediate operand; and transcoding each second intermediate operand to provide an output indicating the one of the plurality of input operands which raises the base value to the maximum value.

* * * * *

UNITED STATES PATENT AND TRADEMARK OFFICE
CERTIFICATE OF CORRECTION

PATENT NO. : 4,734,876

DATED : March 29, 1988

INVENTOR(S) : Tim A. Williams

It is certified that error appears in the above-identified patent and that said Letters Patent is hereby corrected as shown below:

In claim 3, column 8, line 49, change "comprises" to --comprise-- and after "logic" insert --gate--.

Signed and Sealed this

Ninth Day of August, 1988

Attest:

DONALD J. QUIGG

Attesting Officer

Commissioner of Patents and Trademarks